United States Patent
Liu

(10) Patent No.: US 11,682,978 B2
(45) Date of Patent: Jun. 20, 2023

(54) CONVERTER CIRCUIT HAVING HIGH POWER IN ULTRA-WIDE RANGE

(71) Applicant: Shenzhen UUGreenPower Co., Ltd., Guangdong (CN)

(72) Inventor: Hui Liu, Guangdong (CN)

(*) Notice: Subject to any disclaimer, the term of this patent is extended or adjusted under 35 U.S.C. 154(b) by 0 days.

(21) Appl. No.: 17/778,165

(22) PCT Filed: Jul. 19, 2021

(86) PCT No.: PCT/CN2021/107057
§ 371 (c)(1),
(2) Date: May 19, 2022

(87) PCT Pub. No.: WO2022/142279
PCT Pub. Date: Jul. 7, 2022

(65) Prior Publication Data
US 2023/0130296 A1    Apr. 27, 2023

(30) Foreign Application Priority Data

Dec. 30, 2020  (CN) .......................... 202011614169.8

(51) Int. Cl.
*H02M 3/335* (2006.01)
*H02M 1/42* (2007.01)
(Continued)

(52) U.S. Cl.
CPC ..... *H02M 3/33573* (2021.05); *H02M 1/0032* (2021.05); *H02M 1/0077* (2021.05);
(Continued)

(58) Field of Classification Search
CPC ........... H02M 3/33573; H02M 1/0032; H02M 1/0077; H02M 3/01; H02M 1/4216; H02M 1/4241; B60L 53/22; H02J 2207/20
See application file for complete search history.

(56) References Cited

U.S. PATENT DOCUMENTS

2014/0254203 A1   9/2014  Dai et al.
2022/0337153 A1*  10/2022 Lee ......................... H02M 3/01

FOREIGN PATENT DOCUMENTS

CN       104578844 A      4/2015
CN       106100346 A     11/2016
(Continued)

OTHER PUBLICATIONS

International Search Report of PCT/CN2021/107057.

*Primary Examiner* — Adolf D Berhane

(57) ABSTRACT

Disclosed is a converter circuit having high power in an ultra-wide range, which includes a transformer module, a first and second primary input modules, an output module, a high and low voltage mode control module, and a load output module. The first primary input module includes a first primary voltage equalization network, a first switch module and a first LC module, the second primary input module includes a second primary voltage equalization network, a second switch module and a second LC module. The first primary voltage equalization network is connected between a first input capacitor and the second switch module, and the second primary voltage equalization network is connected between a second input capacitor and the first switch module. In this disclosure, it is surprisingly found that through arranging resonant voltage equalization network, a designated primary voltage deviation problem, which is caused by a change of a pulse control of an LLC resonant converter under a light load, is solved.

6 Claims, 9 Drawing Sheets

(51) Int. Cl.
*H02M 3/00* (2006.01)
*H02M 1/00* (2006.01)
*B60L 53/22* (2019.01)

(52) U.S. Cl.
CPC ....... *H02M 1/4216* (2013.01); *H02M 1/4241* (2013.01); *H02M 3/01* (2021.05); *B60L 53/22* (2019.02); *H02J 2207/20* (2020.01)

(56) References Cited

FOREIGN PATENT DOCUMENTS

| CN | 108471238 A | 8/2018 |
| CN | 110138239 A | 8/2019 |
| CN | 110995008 A | 4/2020 |
| CN | 112737347 A | 4/2021 |

* cited by examiner

CONVERTER CIRCUIT HAVING HIGH POWER IN ULTRA-WIDE RANGE

TECHNICAL FIELD

The disclosure relates to the technical field of power supply modules, and more particularly to a converter circuit having high power in an ultra-wide range.

BACKGROUND

In the field of high-power application, the input power source is three-phase AC power grid. Due to the power factor requirements, a three-phase active power factor correction circuit should be designed in the front stage. As the three-phase active power factor correction circuit receives the three-phase power grid input, it has a relatively high output bus voltage. Accordingly, the electrolytic capacitor is usually connected in series according to the current situation of the electron elements, as shown in FIG. 1.

In the two-stage topology application of a charging power supply module, the output voltage BUS+ and BUS− of the front-stage circuit are used as the input voltage of the rear-stage DC/DC converter. Generally, as shown in FIGS. 2A-2B, there are two different connection modes according to different requirements, which both have their own advantages and disadvantages. As shown in FIG. 2A, the midpoint of DC input bus capacitor and the midpoint of power factor correction (PFC) output bus capacitor are connected together, so that the input bus capacitor of DC converter does not have the voltage equalization problem, however, the PFC output bus capacitor has a large voltage equalization pressure, which requires a voltage equalization control at the PFC side. At the same time, the high-frequency ripple of DC converter will enter the PFC output bus capacitor. As shown in FIG. 2B, the midpoint of DC input bus capacitor and the midpoint of PFC output bus capacitor are separated by a resistor, so that PFC side is not affected by the DC side and the high-frequency ripple will not affect the PFC output bus capacitor.

In order to take into account both the high voltage and the low voltage simultaneously and realize the constant power output in a wide voltage range, we have developed a wide range constant power converter, which can be used as the DC/DC converter shown in FIG. 2A and FIG. 2B, thus realizing a constant power charging for an electric automobile in an ultra-wide voltage range covering a low voltage of 250V to a high voltage of 1000V and a rapid charging for the electric automobile in different voltage levels. FIG. 3 has shown the structural diagram of the wide range constant power converter.

In the topology shown in FIG. 3, circuit elements, especially resonant elements, such as resonant capacitor Lr, resonant capacitor Cr, transformer excitation inductor Lm and other resonant elements, have parameter deviations, which are usually in the range of 5% to 10%. In order to solve the voltage equalization problem caused by the deviations of circuit parameters in the topology, four voltage equalization networks are arranged at the secondary side of the transformer to solve the voltage equalization problem caused by the deviations of circuit parameters in the topology, so as to ensure the voltage equalization capacity of the primary capacitor and the secondary capacitor.

In the later applications, we found that when the wide range constant power converter shown in FIG. 3 is applied to the topology shown in FIG. 2A, it can operate normally. However, when the wide range constant power converter shown in FIG. 3 is applied to the topology shown in FIG. 2B, it may face the problem of voltage equalization of the primary capacitors which are connected in series and the secondary capacitors which are connected in series, when carrying a light load or being started up with a light load.

After long-term research and many experiments, we found that, the LLC resonant converter, under the common pulse frequency modulation (PFM) control manner, has the problem of non-monotonic gain when carrying a light load, thus resulting in an unstable output voltage. Therefore, in the light load condition, the PFM control manner should be changed. Different operator can adopt different control methods, such as phase-shift (for example, phase-shift full-bridge topology) control manner, pulse width modulation (PWM) control manner, burst control manner and so on. These control methods for the light load have their own advantages, which can solve the problem of PFM control manner, but may also bring other problems. For PWM or intermittent burst control manners, there will be no pulse generation for a period of time. In the case of no pulse generation, the parasitic parameters of the power tube and printed circuit board (PCB) will participate in the free resonance of the resonant capacitor Cr, resonant inductance Lr and transformer excitation inductance Lm. Under a specific input voltage, or a specific output voltage, when different light loads in different load forms (such as an inverter load, a CC mode, CV mode, CR mode of an electronic load-meter, etc.) are carried, in the specific dynamic process, it is found that the wide range constant power converter shown in FIG. 3 cannot ensure the voltage equalization of the primary and secondary capacitors.

For example, when the output voltage is 700V and the electronic load-meter is in the CC mode with a current of 0.1 A, the output capacitor has a great deviation during startup, which cannot be adjusted automatically and will trigger a secondary voltage deviation shutdown. If just the load form is changed to the CR mode or CV mode of the electronic load-meter (the current is limited to ensure the same load), no voltage deviation shutdown occurs under the same load and same output voltage. Under the same load condition, when the output voltage is changed to 500V, no voltage deviation shutdown occurs. Or when the load is changed to be larger or smaller, still no voltage deviation shutdown occurs. Or when other larger load, which is adjusted to a 0.1 A steady state after startup, is carried, still no voltage deviation shutdown occurs. This kind of voltage deviation only occurs under specific circumstances with a light load, but never occurs under circumstances with a heavy load. The primary voltage deviation is also similar, which will not be described in detail here.

Through further research, it is found that the reasons for such voltage deviation is not caused by the parameter deviations of the resonant elements, but by the change of the pulse control of the LLC resonant converter under a light load. Therefore, the wide range constant power converter shown in FIG. 3 cannot solve this voltage equalization problem.

SUMMARY

In this regard, the present disclosure is aimed at the technical problem of the specific voltage deviation which is caused by the pulse control of the LLC resonant converter under a light load. For solving its technical problem, a converter circuit having high power in an ultra-wide range, which is capable of solving the specific voltage deviation and realizing the voltage equalization under the specific situation, is provided.

According to an aspect, a converter circuit having high power in an ultra-wide range, is provided, which including a first transformer module, a second transformer module, a first primary input module which is arranged at a primary side of the first transformer module, a first secondary output module which is arranged at a secondary side of the first transformer module, a second primary input module which is arranged at a primary side of the second transformer module, a second secondary output module which is arranged at a secondary side of the second transformer module, a high and low voltage mode control module which is operable to control the first secondary output module and the second secondary output module to be connected in series in a high-voltage mode and to be connected in parallel in a low-voltage mode, and a load output module which is operable to receive a serial output voltage or a parallel output voltage of the first secondary output module and the second secondary output module;

wherein the first primary input module includes a first primary voltage equalization network, a first switch module and a first LC module, the second primary input module includes a second primary voltage equalization network, a second switch module and a second LC module, wherein the first primary voltage equalization network is connected between a first input capacitor and the second switch module, and the second primary voltage equalization network is connected between a second input capacitor and the first switch module; wherein the first switch module is connected with the first transformer module through the first LC module, and the second switch module is connected with the second transformer module through the second LC module; through arranging resonant voltage equalization network, a designated primary voltage deviation problem, which is caused by a change of a pulse control of an LLC resonant converter under a light load, is solved.

In the converter circuit having high power in an ultra-wide range according to this disclosure, the first primary voltage equalization network includes a first primary voltage equalization unit and a second primary voltage equalization unit, the first switch module includes a first switch network and a second switch network, the first LC module includes a first LC network and a second LC network, and the second primary voltage equalization network includes a third primary voltage equalization unit and a fourth primary voltage equalization unit, the second switch module includes a third switch network and a fourth switch network, and the second LC module includes a third LC network and a fourth LC network.

In the converter circuit having high power in an ultra-wide range according to this disclosure, a first terminal of the first input capacitor is connected with a first terminal of the first primary voltage equalization unit, a first terminal of the second primary voltage equalization unit, a first terminal of the first switch network and a first terminal of the second switch network; a second terminal of the first input capacitor is connected with a first terminal of the second input capacitor, a first terminal of the third primary voltage equalization unit, a first terminal of the fourth primary voltage equalization unit, a second terminal of the second switch network, a first terminal of the third switch network, a first terminal of the fourth switch network and a second terminal of the first switch network; a second terminal of the second input capacitor is connected with a second terminal of the third switch network and a second terminal of the fourth switch network; a second terminal of the first primary voltage equalization unit and a second terminal of the second primary voltage equalization unit are connected with the first terminal of the second switch network; a third terminal of the first primary voltage equalization unit is connected with a third terminal of the third switch network and the third transformer network; a third terminal of the second primary voltage equalization unit is connected with a third terminal of the fourth switch network and the fourth transformer network; a third terminal of the third primary voltage equalization unit is connected with a third terminal of the second switch network and the second transformer network; a third terminal of the fourth primary voltage equalization unit is connected with a third terminal of the first switch network and the first transformer network; a fourth terminal of the first switch network is connected with the first transformer network through the first LC network; a fourth terminal of the second switch network is connected with the second transformer network through the second LC network; a fourth terminal of the third switch network is connected with the third transformer network through the third LC network; a fourth terminal of the fourth switch network is connected with the fourth transformer network through the fourth LC network.

In the converter circuit having high power in an ultra-wide range according to this disclosure, the first primary voltage equalization unit, the second primary voltage equalization unit, the third primary voltage equalization unit and the fourth primary voltage equalization unit each includes at least one serial diode voltage division branch and at least one LC resonant branch, wherein the serial diode voltage division branch includes at least one pair of serial diodes, and a central connection point of the at least one pair of serial diodes is a voltage division point, two terminals of the serial diode voltage division branch constitute the first terminal and the second terminal of the voltage equalization unit; the LC resonant branch includes at least one group of a resonant inductor and a resonant capacitor which are connected in series, wherein a first terminal of the LC resonant branch is connected with the voltage division point and a second terminal of the LC resonant branch forms the third terminal of the voltage equalization unit.

In the converter circuit having high power in an ultra-wide range according to this disclosure, the high and low voltage mode control module includes a first switch, a second switch and a third switch, wherein the first switch is connected between a first terminal and a second terminal of the high and low voltage mode control module, and the second switch is connected between the first terminal of the high and low voltage mode control module and a second terminal of the load output module, the third switch is connected between the second terminal of the high and low voltage mode control module and a first terminal of the load output module.

In the converter circuit having high power in an ultra-wide range according to this disclosure, the first secondary output module includes a first rectification network, a second rectification network and a first parameter voltage equalization network, the second secondary output module includes a third rectification network, a fourth rectification network and a second parameter voltage equalization network; wherein the first secondary output module or the second secondary output module further includes a first resonant voltage equalization network; an input terminal of the first rectification network is connected with the secondary side of the first transformer module, and an output terminal of the first rectification network is connected with the fourth rectification network through the first parameter voltage equalization network; an input terminal of the second rectification network is connected with the secondary side of the first transformer module, and an output terminal of the second rectification network is connected with the third rectification network through the second parameter voltage equalization network, wherein the third rectification network and the fourth rectification network are also connected with the secondary side of the second transformer module; wherein the converter circuit having high power in an ultra-wide range further includes a first resonant voltage equalization network and a second resonant voltage equalization network, the first resonant voltage equalization network includes a first resonant voltage equalization unit and a second resonant voltage equalization unit, and the second resonant voltage equalization network includes a third resonant voltage equalization unit and a fourth resonant voltage equalization unit; wherein the first parameter voltage equalization network includes a first parameter voltage equalization unit and a second parameter voltage equalization unit, and the second parameter voltage equalization network includes a third parameter voltage equalization unit and a fourth parameter voltage equalization unit.

In the converter circuit having high power in an ultra-wide range according to this disclosure, the first transformer module includes at least a first transformer network and a second transformer network, wherein primary sides of the first transformer network and the second transformer network are connected in series, and secondary sides of the first transformer network and the second transformer network are respectively connected with the first secondary output module; wherein the second transformer module includes at least a third transformer network and a fourth transformer network, primary sides of the third transformer network and the fourth transformer network are connected in series, and secondary sides of the third transformer network and the fourth transformer network are respectively connected with the second secondary output module.

In the converter circuit having high power in an ultra-wide range according to this disclosure, a first input terminal of the first rectification network is connected with a secondary side of the first transformer network, a second input terminal of the first rectification network is connected with a secondary side of the second transformer network, and a first output terminal of the first rectification network is connected with a first terminal of the third rectification network, a first terminal of the first parameter voltage equalization unit and a first terminal of the second parameter voltage equalization unit, a first terminal of the first resonant voltage equalization unit and a first terminal of the second resonant voltage equalization unit, a second output terminal of the first rectification network is connected with a fifth terminal of the third rectification network and a sixth terminal of the third rectification network, a second terminal of the first parameter voltage equalization unit and a second terminal of the second parameter voltage equalization unit, a second terminal of the first resonant voltage equalization unit and a second terminal of the second resonant voltage equalization unit; wherein a first input terminal of the second rectification network is connected with the secondary side of the first transformer network, a second input terminal of the second rectification network is connected with the secondary side of the second transformer network, a first output terminal of the second rectification network is connected with a first terminal of the fourth rectification network and a second terminal of the fourth rectification network, a first terminal of the third parameter voltage equalization unit and a first terminal of the fourth parameter voltage equalization unit, a first terminal of the third resonant voltage equalization unit and a first terminal of the fourth resonant voltage equalization unit, a second output terminal of the second rectification network is connected with a fifth terminal of the fourth rectification network and a sixth terminal of the fourth rectification network, a second terminal of the third parameter voltage equalization unit and a second terminal of the fourth parameter voltage equalization unit, a second terminal of the third resonant voltage equalization unit and a second terminal of the fourth resonant voltage equalization unit; wherein a third terminal of the first parameter voltage equalization unit is connected with a fourth terminal of the fourth rectification network; wherein a third terminal of the second parameter voltage equalization unit is connected with a third terminal of the fourth rectification network; a third terminal of the third parameter voltage equalization unit is connected with a third terminal of the third rectification network; a third terminal of the fourth parameter voltage equalization unit is connected with a fourth terminal of the third rectification network; a third terminal of the first resonant voltage equalization unit is connected with the first input terminal of the second rectification network; a third terminal of the second resonant voltage equalization unit is connected with the second input terminal of the second rectification network; a third terminal of the third resonant voltage equalization unit is connected with the second input terminal of the first rectification network; and a third terminal of the fourth resonant voltage equalization unit is connected with the first input terminal of the first rectification network.

In the converter circuit having high power in an ultra-wide range according to this disclosure, the first transformer network and the second transformer network respectively include one transformer, or more transformers which are connected in series with each other.

When implementing the converter circuit having high power in an ultra-wide range according to this disclosure, it is surprisingly found that through arranging resonant voltage equalization network, a designated primary voltage deviation problem, which is caused by a change of a pulse control of an LLC resonant converter under a light load, is solved.

DESCRIPTION OF THE PREFERRED EMBODIMENTS

In order to have a clearer understanding of the technical features, purpose and effect of this disclosure, the specific embodiment of this disclosure is described in detail with reference to the accompanying drawings. It should be understood that the specific embodiments described herein are only used to explain rather than to limit this disclosure.

A converter circuit having high power in an ultra-wide range, is provided, which including a first transformer module, a second transformer module, a first primary input module which is arranged at a primary side of the first transformer module, a first secondary output module which is arranged at a secondary side of the first transformer module, a second primary input module which is arranged at a primary side of the second transformer module, a second secondary output module which is arranged at a secondary side of the second transformer module, a high and low voltage mode control module which is operable to control the first secondary output module and the second secondary output module to be connected in series in a high-voltage mode and to be connected in parallel in a low-voltage mode, and a load output module which is operable to receive a serial output voltage or a parallel output voltage of the first secondary output module and the second secondary output module; wherein the first primary input module includes a first primary voltage equalization network, a first switch module and a first LC module, the second primary input module includes a second primary voltage equalization network, a second switch module and a second LC module, wherein the first primary voltage equalization network is connected between a first input capacitor and the second switch module, and the second primary voltage equalization network is connected between a second input capacitor and the first switch module; wherein the first switch module is connected with the first transformer module through the first LC module, and the second switch module is connected with the second transformer module through the second LC module. In this disclosure, it is surprisingly found that through arranging resonant voltage equalization network, a designated primary voltage deviation problem, which is caused by a change of a pulse control of an LLC resonant converter under a light load, is solved.

Figure 1:
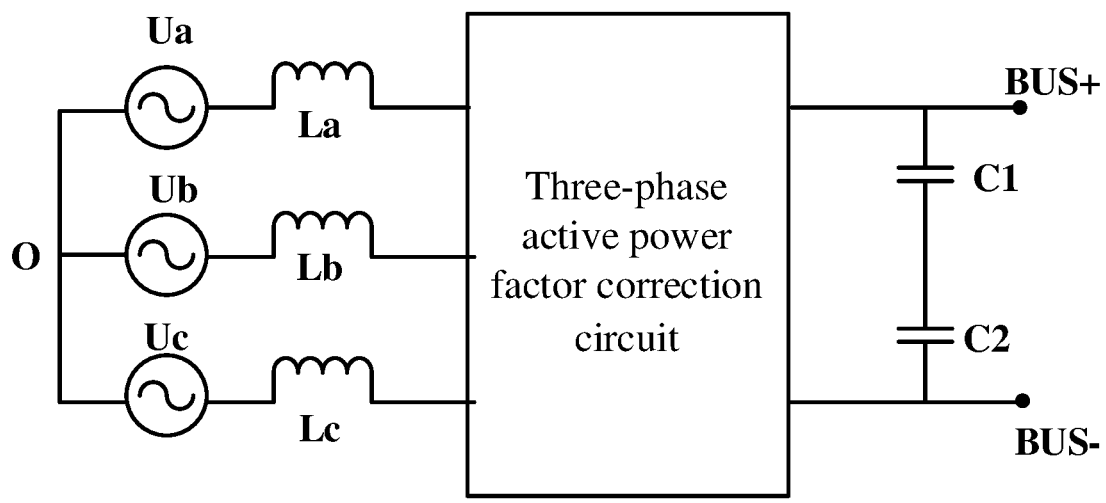
FIG. 1 is a connection diagram of a three-phase active power factor correction circuit for a charging power supply module according to the prior art.
Figure 2A:
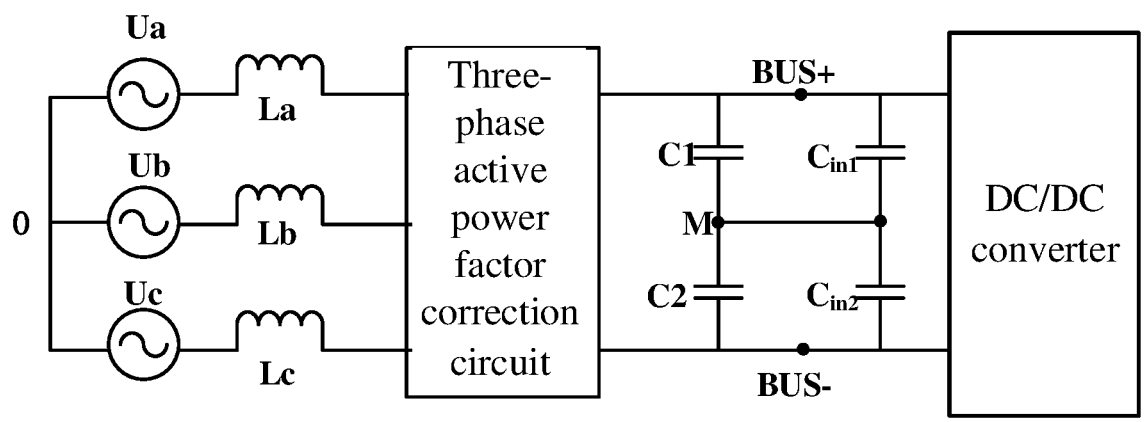
FIG. 2A is a circuit diagram of a two-stage topology of the charging power supply module in a first mode of according to the prior art.
Figure 2B:
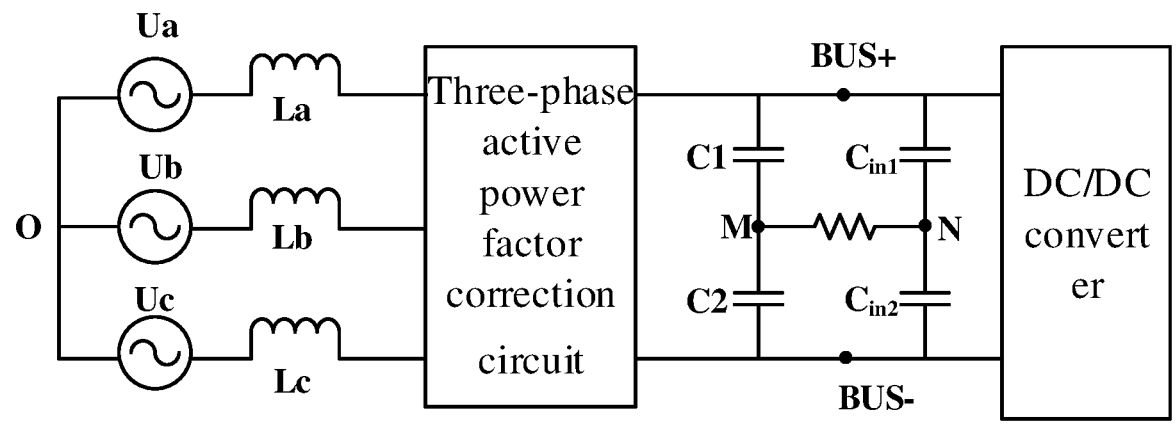
FIG. 2B is a circuit diagram of a two-stage topology of the charging power supply module in a second mode of according to the prior art.
Figure 3:
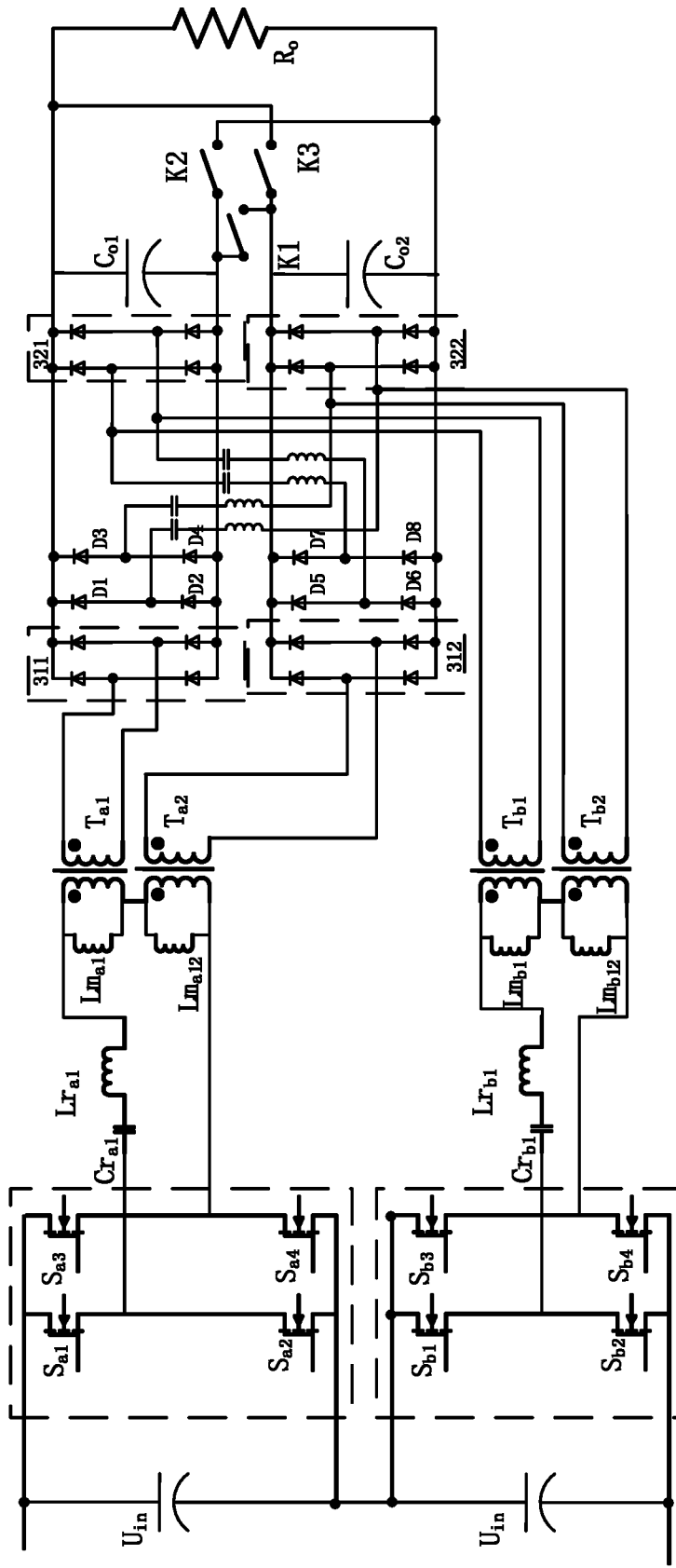
FIG. 3 is a circuit topology diagram of a wide range constant power converter mentioned in the background technology.
Figure 4:
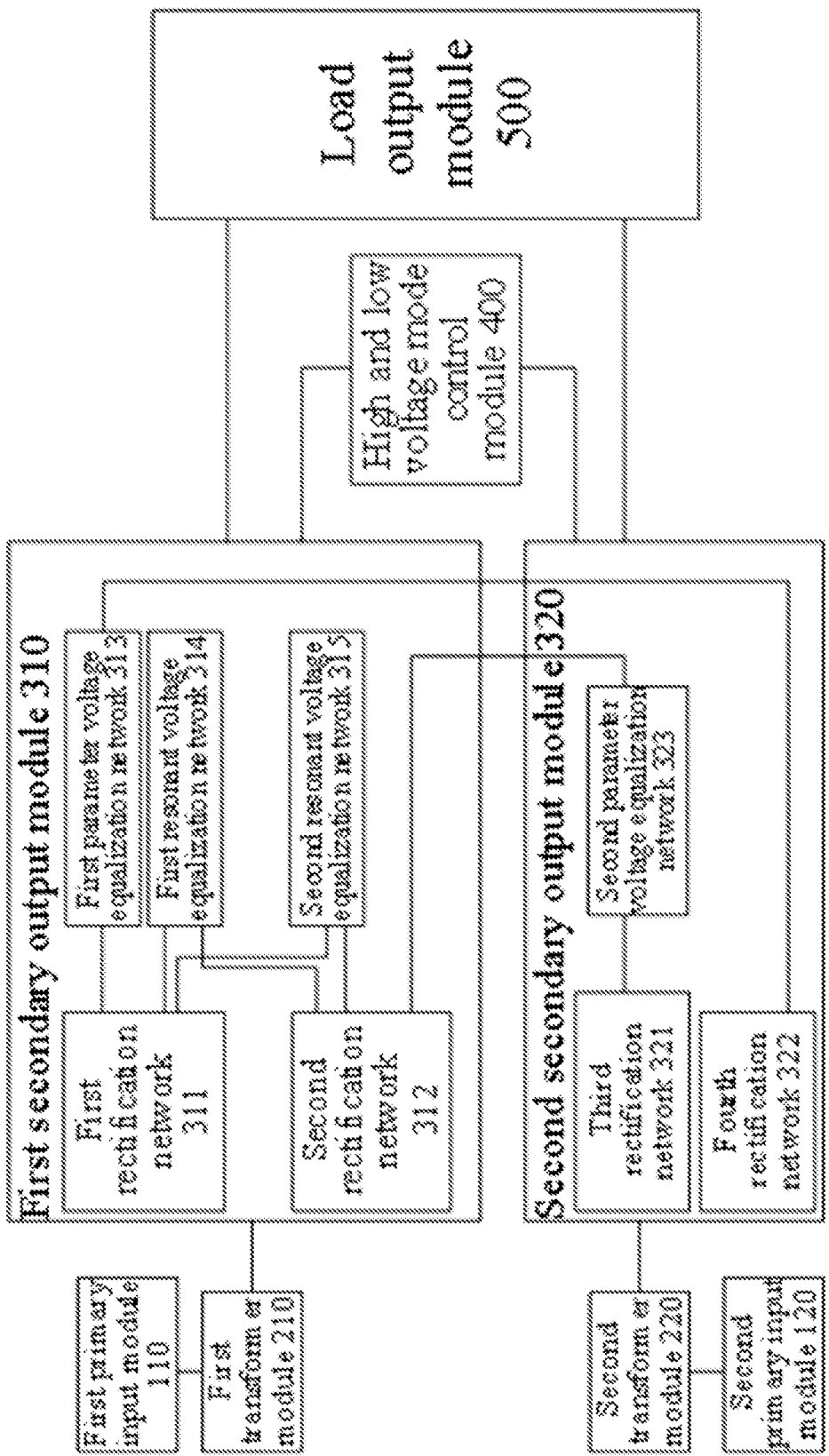
FIG. 4 is a schematic block diagram of a converter circuit having high power in an ultra-wide range according to a preferred embodiment of this disclosure.

FIG. 4 is a schematic block diagram of a converter circuit having high power in an ultra-wide range according to a preferred embodiment of this disclosure.

As shown in FIG. 4, the converter circuit having high power in an ultra-wide range according to a preferred embodiment of this disclosure includes a first transformer module 210, a second transformer module 220, a first primary input module 110 which is arranged at a primary side of the first transformer module 210, a first secondary output module 310 which is arranged at a secondary side of the first transformer module 210, a second primary input module 120 which is arranged at a primary side of the second transformer module 220, a second secondary output module 320 which is arranged at a secondary side of the second transformer module 220, a high and low voltage mode control module 400 which is operable to control the first secondary output module 310 and the second secondary output module 320 to be connected in series in a high-voltage mode and to be connected in parallel in a low-voltage mode, and a load output module 500 which is operable to receive a serial output voltage of the first secondary output module 310 and the second secondary output module 320 or a parallel output voltage of the first secondary output module 310 and the second secondary output module 320. Further referring FIG. 4, the first secondary output module 310 includes a first rectification network 311, a second rectification network 312 and a first parameter voltage equalization network 313, the second secondary output module 320 includes a third rectification network 321, a fourth rectification network 322 and a second parameter voltage equalization network 323. Furthermore, in the embodiment shown in FIG. 4, the first secondary output module 310 further includes a first resonant voltage equalization network 314 and a second resonant voltage equalization network 315.

In this embodiment, an input terminal of the first rectification network 311 is connected with the secondary side of the first transformer module 210, and an output terminal of the first rectification network 311 is connected with the fourth rectification network 322 through the first parameter voltage equalization network 313. An input terminal of the second rectification network 312 is connected with the secondary side of the first transformer module 210, and an output terminal of the second rectification network 312 is connected with the third rectification network 321 through the second parameter voltage equalization network 323, wherein the third rectification network 321 and the fourth rectification network 322 are also connected with the secondary side of the second transformer module 220. A first terminal and a second terminal of the first resonant voltage equalization network 314 are respectively connected with two output terminals of the first rectification network 311, while a third terminal of the first resonant voltage equalization network 314 is connected with an input terminal of the second rectification network 312. A first terminal and a second terminal of the second resonant voltage equalization network 315 are respectively connected with two output terminals of the second rectification network 312, while a third terminal of the second resonant voltage equalization network 315 is connected with an input terminal of the first rectification network 311. In a simplified preferred embodiment of this disclosure, only the first resonant voltage equalization network 314 or the second resonant voltage equalization network 315 may be provided. Of course, it is more preferable to arrange both of the first resonant voltage equalization network 314 and second resonant voltage equalization network 315 at the same time.

In the preferred embodiment of this disclosure, the first primary input module 110, the second primary input module 120, the first transformer module 210, the second transformer module 220, the high and low voltage mode control module 400 and the load output module 500 may be constructed by using any module known in the prior art.

Furthermore, in a further preferred embodiment of this disclosure, the converter circuit having high power in an ultra-wide range can further include a third transformer module, a third primary input module which is arranged at a primary side of the third transformer module, and a third secondary output module which is arranged at a secondary side of the third transformer module. The high and low voltage mode control module 400 is further operable to control the first secondary output module 310, the second secondary output module 320 and the third secondary output module to be connected in series in a high-voltage mode and to be connected in parallel in a low-voltage mode. The load output module 500 which is operable to receive a serial output voltage of the first secondary output module 310, the second secondary output module 320 and the third secondary output module or a parallel output voltage of the first secondary output module 310, the second secondary output module 320 and the third secondary output module. The construction of the third transformer module, third primary input module and third secondary output module may refer to that of the first transformer module 210, the second transformer module 220, the first primary input module 110, the second primary input module 120, the first secondary output module 310 and the second secondary output module 320, respectively. In a preferred embodiment of this disclosure, the first rectification network 311, the second rectification network 312, the third rectification network 321 and the fourth rectification network 322 may include a diode full-bridge rectification unit, a switch tube full-bridge rectification unit, a diode half-bridge rectification unit, and/or a switch tube half-bridge rectification unit.

In a further preferred embodiment of this disclosure, the first resonant voltage equalization network 314 includes a first resonant voltage equalization unit and a second resonant voltage equalization unit, and the second resonant voltage equalization network 315 includes a third resonant voltage equalization unit and a fourth resonant voltage equalization unit; wherein the first parameter voltage equalization network 313 includes a first parameter voltage equalization unit and a second parameter voltage equalization unit, and the second parameter voltage equalization network 323 includes a third parameter voltage equalization unit and a fourth parameter voltage equalization unit. Of course, in other preferred embodiments of this disclosure, the first resonant voltage equalization unit 314 and the second resonant voltage equalization unit 315 may include only one resonant voltage equalization unit, or three or more resonant voltage equalization units, respectively. Similarly, the first parameter voltage equalization network 313 and the second parameter voltage equalization network 323 may include only one parameter voltage equalization unit, or three or more parameter voltage equalization units, respectively.

The structures of the first resonance voltage equalization unit, the second resonance voltage equalization unit, the third resonance voltage equalization unit, the fourth resonance voltage equalization unit, the first parameter voltage equalization unit, the second parameter voltage equalization unit, the third parameter voltage equalization unit and the fourth parameter voltage equalization unit may be the same. Each voltage equalization unit may include at least one serial diode voltage division branch and at least one LC resonant branch, wherein the serial diode voltage division branch includes at least one pair of serial diodes, and a central connection point of the at least one pair of serial diodes is a voltage division point, two terminals of the serial diode voltage division branch constitute the first terminal and the second terminal of the voltage equalization unit. The LC resonant branch includes at least one group of a resonant inductor and a resonant capacitor which are connected in series, wherein a first terminal of the LC resonant branch is connected with the voltage division point and a second terminal of the LC resonant branch forms the third terminal of the voltage equalization unit. In the preferred embodiment of this disclosure, the positions of the resonant inductor and the resonant capacitor can be exchanged.

In this disclosure, it is surprisingly found that through arranging resonant voltage equalization network, a designated secondary voltage deviation problem, which is caused by a change of a pulse control of an LLC resonant converter under a light load, is solved.

Figure 5:
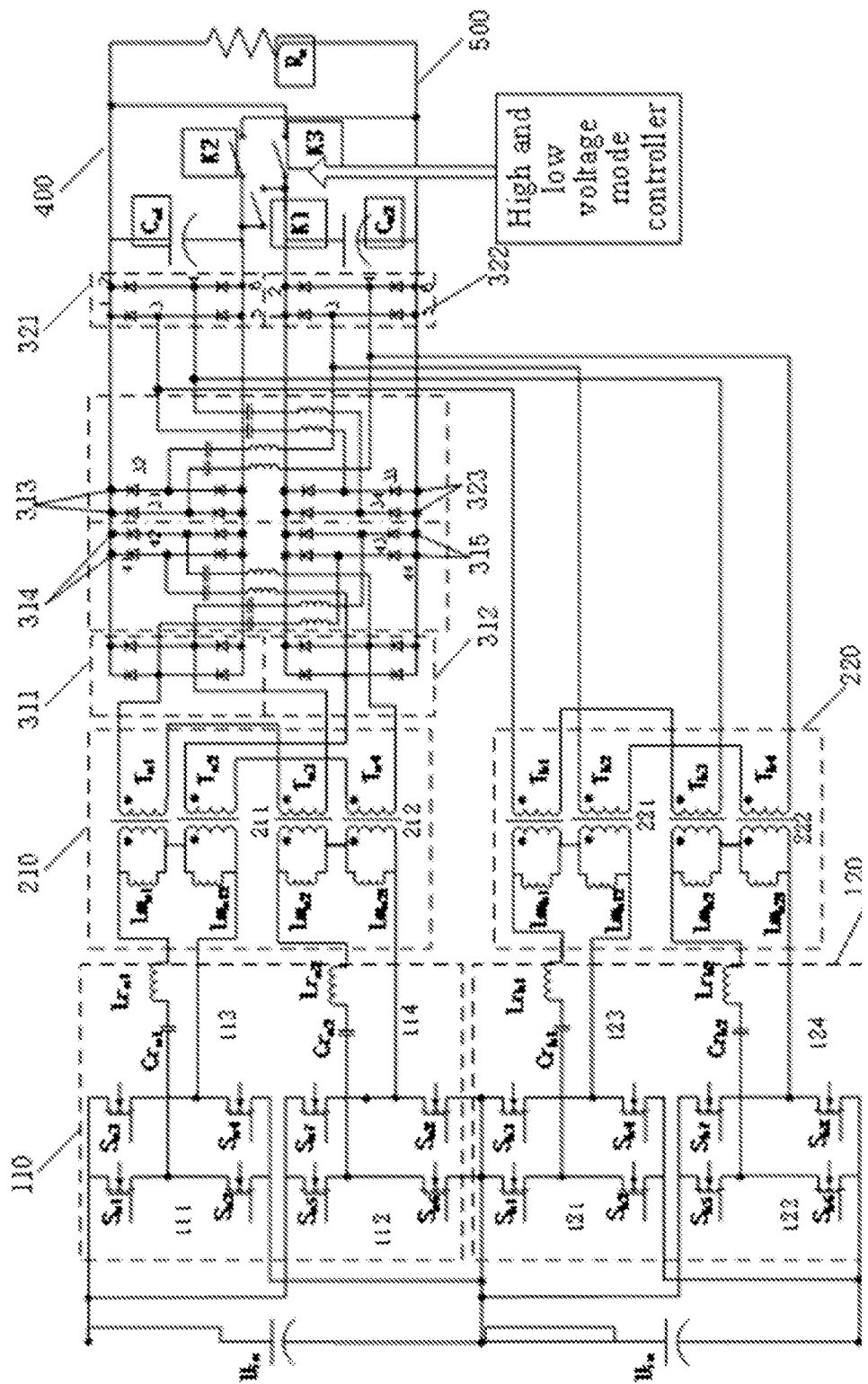
FIG. 5 is a circuit schematic diagram of a converter circuit having high power in an ultra-wide range according to a preferred embodiment of this disclosure.

FIG. 5 is a circuit schematic diagram of a converter circuit having high power in an ultra-wide range according to a preferred embodiment of this disclosure. As shown in FIG. 5, the converter circuit having high power in an ultra-wide range according to a preferred embodiment of this disclosure includes a first transformer module 210, a second transformer module 220, a first primary input module 110 which is arranged at a primary side of the first transformer module 210, a first secondary output module 310 which is arranged at a secondary side of the first transformer module 210, a second primary input module 120 which is arranged at a primary side of the second transformer module 220, a second secondary output module 320 which is arranged at a secondary side of the second transformer module 220, a high and low voltage mode control module 400 which is operable to control the first secondary output module 310 and the second secondary output module 320 to be connected in series in a high-voltage mode and to be connected in parallel in a low-voltage mode, and a load output module 500 which is operable to receive a serial output voltage of the first secondary output module 310 and the second secondary output module 320 or a parallel output voltage of the first secondary output module 310 and the second secondary output module 320.

Further referring FIG. 5, the first transformer module 210 includes at least a first transformer network 211 and a second transformer network 212, wherein primary sides of the first transformer network 211 and the second transformer network 212 are connected in series, and secondary sides of the first transformer network 211 and the second transformer network 212 are respectively connected with the first secondary output module 310. The second transformer module 220 includes at least a third transformer network 221 and a fourth transformer network 222, primary sides of the third transformer network 221 and the fourth transformer network 222 are connected in series, and secondary sides of the third transformer network 221 and the fourth transformer network 222 are respectively connected with the second secondary output module 320.

In a preferred embodiment of this disclosure, the first transformer network 211, the second transformer network 212, the third transformer network 221 and the fourth transformer network 222 respectively include one transformer, and a primary inductor of the transformer can be connected in parallel with its primary winding, respectively. Herein, the primary inductor can be designed separately or integrated in the transformer. For example, the first transformer network 211 may include a transformer Ta1 with an equivalent inductor Lma1, and the second transformer network 212 includes a transformer Ta2 with an equivalent inductor Lma2 and their equivalent inductors finally form an equivalent inductor Lm. The inductor Lm can be the equivalent inductor of the integrated or separately designed inductors Lma1 and Lma2, or can be a separately designed inductor Lm, both of which are within the scope of protection of this disclosure. For the third transformer network 221 and the fourth transformer network 222, the implementations are the same. Of course, the first transformer network 211, the second transformer network 212, the third transformer network 221 and the fourth transformer network 222 may also include a plurality of transformers, respectively.

As shown in FIG. 5, the primary windings of transformers Ta1 and Ta2 are connected in series, the primary windings of transformers Ta3 and Ta4 are connected in series, the secondary windings of transformers Ta1 and Ta3 are connected in series, and the secondary windings of transformers Ta2 and Ta4 are connected in series. Similarly, other transformer modules can also be of similar construction. Of course, in other preferred embodiments of this disclosure, the actual number of transformers in the transformer network or the number of transformer networks in the transformer module can be adjusted according to the actual needs. In a further preferred embodiment of this disclosure, each transformer network can be connected in series or in parallel with each other.

Further referring FIG. 5, the first secondary output module 310 includes a first rectification network 311, a second rectification network 312 and a first parameter voltage equalization network 313, a first resonant voltage equalization network 314 and a second resonant voltage equalization network 315, the second secondary output module 320 includes a third rectification network 321, a fourth rectification network 322 and a second parameter voltage equalization network 323.

In the present embodiment, the first rectification network 311, the second rectification network 312, the third rectification network 321, and the fourth rectification network 322 are full-bridge rectification networks which are composed of four diodes. The first resonant voltage equalization network 314 includes a first resonant voltage equalization unit 41 and a second resonant voltage equalization unit 42, and the second resonant voltage equalization network 315 includes a third resonant voltage equalization unit 43 and a fourth resonant voltage equalization unit 44. The first parameter voltage equalization network 313 includes a first parameter voltage equalization unit 31 and a second parameter voltage equalization unit 32, and the second parameter voltage equalization network 323 includes a third parameter voltage equalization unit 33 and a fourth parameter voltage equalization unit 34. In this embodiment, each voltage equalization unit may include a serial diode voltage division branch and an LC resonant branch, wherein the serial diode voltage division branch includes a pair of serial diodes, and a central connection point of the pair of serial diodes is a voltage division point, two terminals of the serial diode voltage division branch constitute the first terminal and the second terminal of the voltage equalization unit. The LC resonant branch includes a resonant inductor and a resonant capacitor which are connected in series, wherein a first terminal of the LC resonant branch is connected with the voltage division point and a second terminal of the LC resonant branch forms the third terminal of the voltage equalization unit.

Accordingly, as shown in FIG. 5, a first input terminal of the first rectification network 311 is connected with the secondary side of the first transformer module 210 (namely, the output homonymous terminal of transformer Ta1), a second input terminal of the first rectification network 311 is connected with the secondary side of the second transformer module 220 (namely, the output non-homonymous terminal of transformer Ta3). A first output terminal of the first rectification network 311 is connected with a first terminal of the third rectification network 321, a first terminal of the first parameter voltage equalization unit 31, a first terminal of the second parameter voltage equalization unit 32, a first terminal of the first resonant voltage equalization unit 41 and a first terminal of the second resonant voltage equalization unit 42. A second output terminal of the first rectification network 311 is connected with a fifth terminal of the third rectification network 321 and a sixth terminal of the third rectification network 321, a second terminal of the first parameter voltage equalization unit 31, a second terminal of the second parameter voltage equalization unit 32, a second terminal of the first resonant voltage equalization unit 41 and a second terminal of the second resonant voltage equalization unit 42. A first input terminal of the second rectification network 312 is connected with the secondary side of the first transformer network 211 (namely, the output homonymous terminal of transformer Ta2), a second input terminal of the second rectification network 312 is connected with the secondary side of the second transformer network 212 (namely, the output non-homonymous terminal of transformer Ta4). A first output terminal of the second rectification network 312 is connected with a first terminal of the fourth rectification network 322 and a second terminal of the fourth rectification network 322, a first terminal of the third parameter voltage equalization unit 33, a first terminal of the fourth parameter voltage equalization unit 34, a first terminal of the third resonant voltage equalization unit 43 and a first terminal of the fourth resonant voltage equalization unit 44. A second output terminal of the second rectification network 312 is connected with a fifth terminal of the fourth rectification network 322 and a sixth terminal of the fourth rectification network 322, a second terminal of the third parameter voltage equalization unit 33, a second terminal of the fourth parameter voltage equalization unit 34, a second terminal of the third resonant voltage equalization unit 43 and a second terminal of the fourth resonant voltage equalization unit 44. A third terminal of the first parameter voltage equalization unit 31 is connected with a fourth terminal of the fourth rectification network 322, a third terminal of the second parameter voltage equalization unit 32 is connected with a third terminal of the fourth rectification network 322, a third terminal of the third parameter voltage equalization unit 33 is connected with a third terminal of the third rectification network 321, while a third terminal of the fourth parameter voltage equalization unit 34 is connected with a fourth terminal of the third rectification network 321. A third terminal of the first resonant voltage equalization unit 41 is connected with the first input terminal of the second rectification network 312, a third terminal of the second resonant voltage equalization unit 42 is connected with the second input terminal of the second rectification network 312, a third terminal of the third resonant voltage equalization unit 43 is connected with the second input terminal of the first rectification network 311, while a third terminal of the fourth resonant voltage equalization unit 44 is connected with the first input terminal of the first rectification network 311.

As shown in FIG. 5, the first resonant voltage equalization unit 41, the second resonant voltage equalization unit 42, the third resonant voltage equalization unit 43 and the fourth resonant voltage equalization unit 44, the first parameter voltage equalization unit 31, the second parameter voltage equalization unit 32, the third parameter voltage equalization unit 33 and the fourth parameter voltage equalization unit 34 have the same structure. Each voltage equalization unit includes one serial diode voltage division branch and one LC resonant branch, wherein the serial diode voltage division branch includes one pair of serial diodes, and a central connection point of the pair of serial diodes is a voltage division point, two terminals of the serial diode voltage division branch constitute the first terminal and the second terminal of the voltage equalization unit. The LC resonant branch includes at least one group of a resonant inductor and a resonant capacitor which are connected in series, wherein a first terminal of the LC resonant branch is connected with the voltage division point and a second terminal of the LC resonant branch forms the third terminal of the voltage equalization unit. In the preferred embodiment of this disclosure, the positions of the resonant inductor and the resonant capacitor can be exchanged. In a further preferred embodiment, just one, two or three of the first resonant voltage equalization unit 41, the second resonant voltage equalization unit 42, the third resonant voltage equalization unit 43 and the fourth resonant voltage equalization unit 44, can be arranged.

In this disclosure, resonant voltage equalization units are arranged in the form of a cross between the input terminal and output terminal of the rectification network, it is surprisingly found that through arranging the resonant voltage equalization units, a designated secondary voltage deviation problem, which is caused by a change of a pulse control of an LLC resonant converter under a light load, is solved.

In this embodiment, the high and low voltage mode control module 400 includes a first switch K1, a second switch K2 and a third switch K3, and a high and low voltage mode controller 410 for controlling the first switch K1, the second switch K2 and the third switch K3. The first switch K1 is connected between a first terminal and a second terminal of the high and low voltage mode control module 400, and the second switch K2 is connected between the first terminal of the high and low voltage mode control module 400 and a second terminal of a load R0, the third switch K3 is connected between the second terminal of the high and low voltage mode control module 400 and a first terminal of the load R0. Meanwhile, the first terminal of the high and low voltage mode control module 400 is connected with one output terminal of the first rectification network 311 and the third rectification network 321, while the second terminal of the high and low voltage mode control module 400 is connected with one output terminal of the third rectification network 321 and the fourth rectification network 322. In this way, when charging a low-voltage electric automobile, the low-voltage mode is selected. Through the control logic of the high and low voltage mode controller 410, the switch K1 is electrically disconnected and the switches K2 and K3 are electrically connected to realize the constant power output of the low-voltage mode. When charging the high-voltage electric automobile, the high-voltage mode is selected. Through the control logic of the high and low voltage mode controller 410, the switch K1 is electrically connected while the switches K2 and K3 are electrically disconnected with realize the constant power output of the high-voltage mode.

Further referring FIG. 5, the first primary input module 110 further includes a first switch module and a first LC module, the second primary input module 120 further includes a second switch module and a second LC module. Wherein the first switch module includes a first switch network 111 and a second switch network 112, the first LC module includes a first LC network 113 and a second LC network 114, the second switch module includes a third switch network 121 and a fourth switch network 122, and the second LC module includes a third LC network 123 and a fourth LC network 124.

In a preferable embodiment of the present application, the first switch network 111 and the second switch network 112, the third switch network 121 and the fourth switch network 122, are a first switch tube full-bridge network and a second switch tube full-bridge network which are connected in parallel, respectively. Each switch tube full-bridge network includes four switch tubes. The first LC network 113, the second LC network 114, the third LC network 123 and the fourth LC network 124 include a group of capacitor and inductor which are connected in series, respectively. As shown in FIG. 5, the switch tubes Sa1-Sa8 constitute the first switch network, the switch tubes Sb1-Sb8 constitute the second switch network. The first LC network 113, which is composed of capacitor Cra1 and resistor Lra1, is connected with the output terminal of the first switch network 111 and the primary side of the first transformer network 211; the second LC network, which is composed of capacitor Cra2 and resistor Lra2, is connected with the output terminal of the second switch network 112 and the primary side of the second transformer network 212; the third LC network 123, which is composed of capacitor Cra3 and resistor Lra3, is connected with the output terminal of the third switch network 121 and the primary side of the third transformer network 221; and the fourth LC network 124, which is composed of capacitor Cra4 and resistor Lra4, is connected with the output terminal of the fourth switch network 122 and the primary side of the fourth transformer network 222.

When implementing the converter circuit having high power in an ultra-wide range according to this disclosure, through arranging parameter voltage equalization units, the problem of serious voltage imbalance, which is caused by the device parameter deviation, is solved, while satisfying the demands of high voltage and high power. Meanwhile, through arranging resonant voltage equalization units, a designated secondary voltage deviation problem, which is caused by a change of a pulse control of an LLC resonant converter under a light load, is solved.

Figure 6:
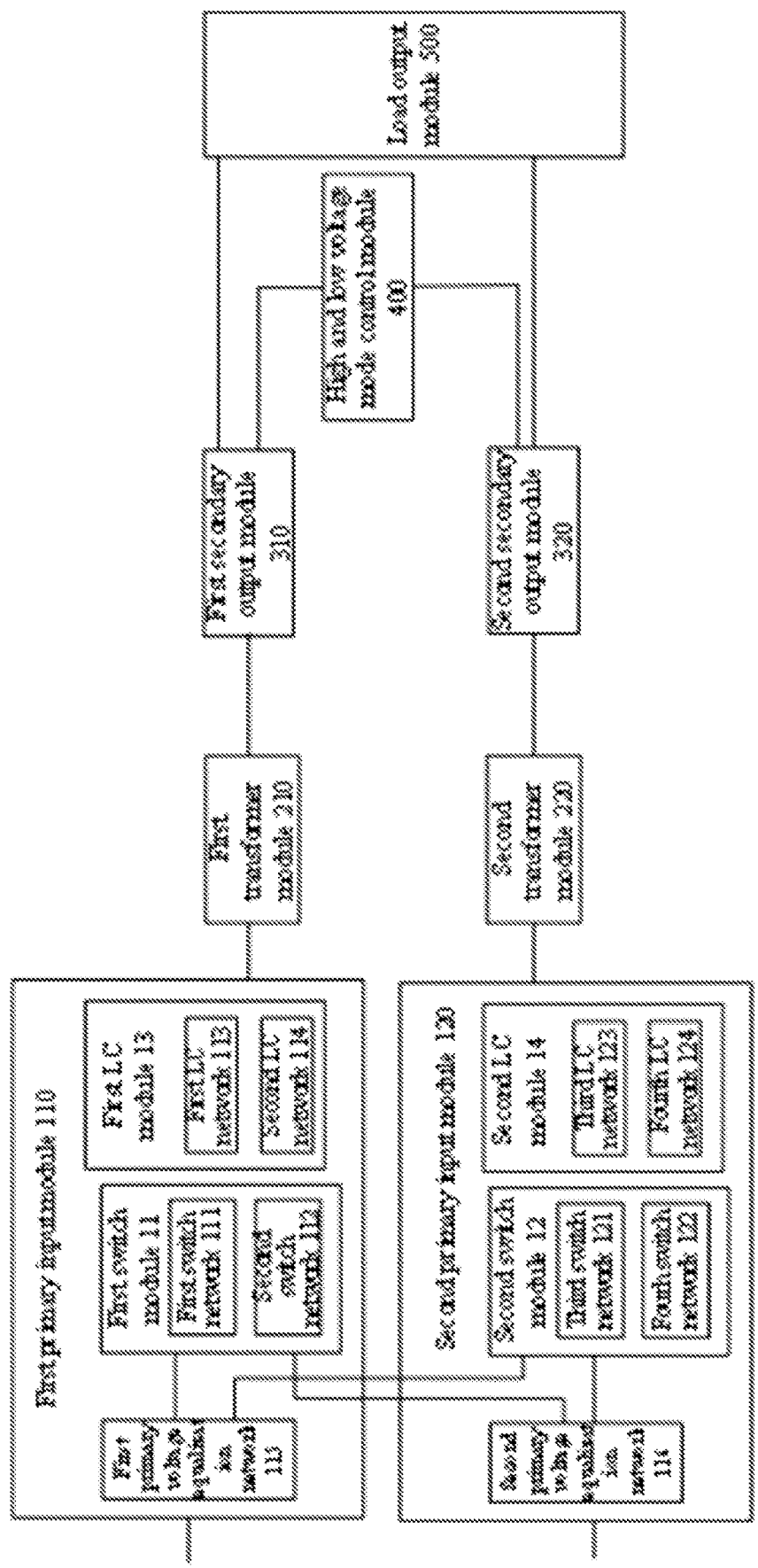
FIG. 6 is a circuit schematic diagram of a converter circuit having high power in an ultra-wide range according to a further preferred embodiment of this disclosure.

FIG. 6 is a circuit schematic diagram of a converter circuit having high power in an ultra-wide range according to a further preferred embodiment of this disclosure. As shown in FIG. 6, the converter circuit having high power in an ultra-wide range according to a preferred embodiment of this disclosure includes a first transformer module 210, a second transformer module 220, a first primary input module 110 which is arranged at a primary side of the first transformer module 210, a first secondary output module 310 which is arranged at a secondary side of the first transformer module 210, a second primary input module 120 which is arranged at a primary side of the second transformer module 220, a second secondary output module 320 which is arranged at a secondary side of the second transformer module 220, a high and low voltage mode control module 400 which is operable to control the first secondary output module 310 and the second secondary output module 320 to be connected in series in a high-voltage mode and to be connected in parallel in a low-voltage mode, and a load output module 500 which is operable to receive a serial output voltage of the first secondary output module 310 and the second secondary output module 320 or a parallel output voltage of the first secondary output module 310 and the second secondary output module 320.

Further referring FIG. 6, the first primary input module 110 includes a first primary voltage equalization network 115, a first switch module 11 and a first LC module 13, the second primary input module 120 includes a second primary voltage equalization network 125, a second switch module 12 and a second LC module 14, wherein the first primary voltage equalization network 115 is connected between first input capacitor Cin1 and the second switch module 12, and the second primary voltage equalization network 125 is connected between a second input capacitor Cin2 and the first switch module 11; wherein the first switch module 11 is connected with the first transformer module 210 through the first LC module 13, and the second switch module 12 is connected with the second transformer module 220 through the second LC module 14.

Further referring FIG. 6, the first transformer module 210, the second transformer module 220, the first secondary output module 310, the second secondary output module 320, the high and low voltage mode control module 400 and the load output module 500 can be constructed according to any know module in the present technical field. For another example, these modules can also be constructed according to any embodiments discussed referring FIG. 4 and FIG. 5.

In a preferred embodiment of this disclosure, the first switch module 11 and the second switch module 12 can be the same circuit connection structure, which can be a full-bridge topology, a symmetrical half-bridge, or an asymmetric half-bridge topology. The first LC module 13 and the second LC module 14 may include a group of capacitors and inductors which are connected in series, respectively.

In a preferred embodiment of this disclosure, the first primary voltage equalization network 115 includes a first primary voltage equalization unit and a second primary voltage equalization unit, while the second primary voltage equalization network 125 includes a third primary voltage equalization unit and a fourth primary voltage equalization unit. Each voltage equalization unit includes at least one serial diode voltage division branch and at least one LC resonant branch, wherein the serial diode voltage division branch includes at least one pair of serial diodes, and a central connection point of the at least one pair of serial diodes is a voltage division point, two terminals of the serial diode voltage division branch constitute the first terminal and the second terminal of the voltage equalization unit; the LC resonant branch includes at least one group of a resonant inductor and a resonant capacitor which are connected in series, wherein a first terminal of the LC resonant branch is connected with the voltage division point and a second terminal of the LC resonant branch forms the third terminal of the voltage equalization unit. In other embodiments of this disclosure, the first primary voltage equalization network 115 and the second primary voltage equalization network 125 can just include one voltage equalization unit.

In this disclosure, voltage equalization networks are arranged in the form of a cross between the switch module at the primary side of the transforms and the input capacitor, it is surprisingly found that a designated primary voltage deviation problem, which is caused by a change of a pulse control of an LLC resonant converter under a light load, is solved.

Figure 7:
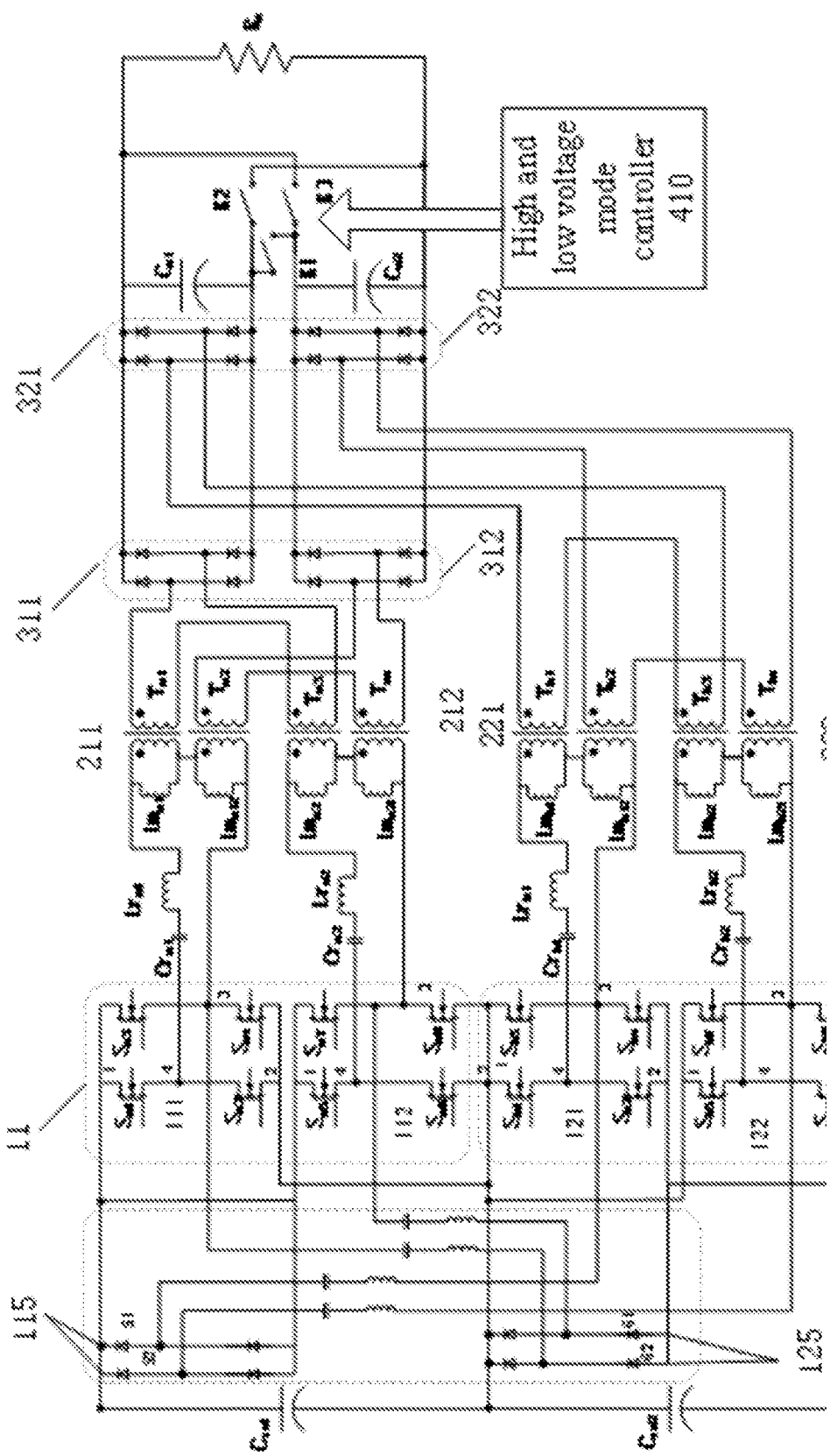
FIG. 7 is a circuit schematic diagram of a converter circuit having high power in an ultra-wide range according to another preferred embodiment of this disclosure.

FIG. 7 is a circuit schematic diagram of a converter circuit having high power in an ultra-wide range according to another preferred embodiment of this disclosure. Combining FIG. 6 and FIG. 7, the converter circuit having high power in an ultra-wide range according to a preferred embodiment of this disclosure includes a first transformer module 210, a second transformer module 220, a first primary input module 110 which is arranged at a primary side of the first transformer module 210, a first secondary output module 310 which is arranged at a secondary side of the first transformer module 210, a second primary input module 120 which is arranged at a primary side of the second transformer module 220, a second secondary output module 320 which is arranged at a secondary side of the second transformer module 220, a high and low voltage mode control module 400 which is operable to control the first secondary output module 310 and the second secondary output module 320 to be connected in series in a high-voltage mode and to be connected in parallel in a low-voltage mode, and a load output module 500 which is operable to receive a serial output voltage of the first secondary output module 310 and the second secondary output module 320 or a parallel output voltage of the first secondary output module 310 and the second secondary output module 320.

The first transformer module 210 includes at least a first transformer network 211 and a second transformer network 212, wherein primary sides of the first transformer network 211 and the second transformer network 212 are connected in series, and secondary sides of the first transformer network 211 and the second transformer network 212 are respectively connected with the first secondary output module 310. The second transformer module 220 includes at least a third transformer network 221 and a fourth transformer network 222, primary sides of the third transformer network 221 and the fourth transformer network 222 are connected in series, and secondary sides of the third transformer network 221 and the fourth transformer network 222 are respectively connected with the second secondary output module 320.

In a preferred embodiment of this disclosure, the first transformer network 211, the second transformer network 212, the third transformer network 221 and the fourth transformer network 222 respectively include one transformer, and a primary inductor of the transformer can be connected in parallel with its primary winding, respectively. Herein, the primary inductor can be designed separately or integrated in the transformer. For example, the first transformer network 211 may include a transformer Ta1 with an equivalent inductor Lma1, and the second transformer network 212 includes a transformer Ta2 with an equivalent inductor Lma2. Their equivalent inductors finally form an equivalent inductor Lm. The inductor Lm can be the equivalent inductor of the integrated or separately designed inductors Lma1 and Lma12, or can be a separately designed inductor Lm, both of which are within the scope of protection of this disclosure. For the third transformer network 221 and the fourth transformer network 222, the design is the same. Of course, the first transformer network 211, the second transformer network 212, the third transformer network 221 and the fourth transformer network 222 may also include a plurality of transformers, respectively.

As shown in FIG. 7, the primary windings of transformers Ta1 and Ta2 are connected in series, the primary windings of transformers Ta3 and Ta4 are connected in series, the secondary windings of transformers Ta1 and Ta3 are connected in series, and the secondary windings of transformers Ta2 and Ta4 are connected in series. Similarly, other transformer modules can also be of similar construction. Of course, in other preferred embodiments of this disclosure, the actual number of transformers in the transformer network or the number of transformer networks in the transformer module can be adjusted according to the actual needs. In a further preferred embodiment of this disclosure, each transformer network can be connected in series or in parallel with each other.

Further referring FIG. 7, the first secondary output module 310 includes a first rectification network 311 and a second rectification network 312, while the second secondary output module 320 includes a third rectification network 321 and a fourth rectification network 322. A first input terminal of the first rectification network 311 is connected with the secondary side of the first transformer network 211 (namely, the output homonymous terminal of transformer Ta1), a second input terminal of the first rectification network 311 is connected with the secondary side of the second transformer network 212 (namely, the output non-homonymous terminal of transformer Ta3). A first output terminal of the first rectification network 311 is connected with a first terminal of the third rectification network 321, a second output terminal of the first rectification network 311 is connected with a fifth terminal of the third rectification network 321 and a sixth terminal of the third rectification network 32. A first input terminal of the second rectification network 312 is connected with the secondary side of the first transformer network 211 (namely, the output homonymous terminal of transformer Ta2), a second input terminal of the second rectification network 312 is connected with the secondary side of the second transformer network 212 (namely, the output non-homonymous terminal of transformer Ta4). A first output terminal of the second rectification network 312 is connected with a first terminal of the fourth rectification network 322 and a second terminal of the fourth rectification network 322, while a second output terminal of the second rectification network 312 is connected with a fifth terminal of the fourth rectification network 322 and a sixth terminal of the fourth rectification network 322.

The high and low voltage mode control module 400 includes a first switch K1, a second switch K2 and a third switch K3, and a high and low voltage mode controller 410 for controlling the first switch K1, the second switch K2 and the third switch K3. The first switch K1 is connected between a first terminal and a second terminal of the high and low voltage mode control module 400, and the second switch K2 is connected between the first terminal of the high and low voltage mode control module 400 and a second terminal of a load R0, the third switch K3 is connected between the second terminal of the high and low voltage mode control module 400 and a first terminal of the load R0. Meanwhile, the first terminal of the high and low voltage mode control module 400 is connected with one output terminal of the first rectification network 311 and the third rectification network 321, while the second terminal of the high and low voltage mode control module 400 is connected with one output terminal of the third rectification network 321 and the fourth rectification network 322. In this way, when charging a low-voltage electric automobile, the low-voltage mode is selected. Through the control logic of the high and low voltage mode controller 410, the switch K1 is electrically disconnected and the switches K2 and K3 are electrically connected to realize the constant power output of the low-voltage mode. When charging the high-voltage electric automobile, the high-voltage mode is selected. Through the control logic of the high and low voltage mode controller 410, the switch K1 is electrically connected while the switches K2 and K3 are electrically disconnected with realize the constant power output of the high-voltage mode.

Further referring FIG. 7, the first primary input module 110 includes a first primary voltage equalization network 115, a first switch network 111, a second switch network 112, a first LC network 113 and a second LC network 114, while the second primary input module 120 includes a second primary voltage equalization network 125, a third switch network 121, a fourth switch network 122, a third LC network 123 and a fourth LC network 124. As shown in FIG. 7, the first switch network 111 and the second switch network 112, the third switch network 121 and the fourth switch network 122, are a first switch tube full-bridge network and a second switch tube full-bridge network which are connected in parallel, respectively. Each switch tube full-bridge network includes four switch tubes. The first LC network 113, the second LC network 114, the third LC network 123 and the fourth LC network 124 include a group of capacitor and inductor which are connected in series, respectively. As shown in FIG. 7, the switch tubes Sa1-Sa8 constitute the first switch network, the switch tubes Sb1-Sb8 constitute the second switch network. The first LC network 113, which is composed of capacitor Cra1 and resistor Lra1, is connected with the output terminal of the first switch network 111 and the primary side of the first transformer network 211; the second LC network, which is composed of capacitor Cra2 and resistor Lra2, is connected with the output terminal of the second switch network 112 and the primary side of the second transformer network 212; the third LC network 123, which is composed of capacitor Cra3 and resistor Lra3, is connected with the output terminal of the third switch network 121 and the primary side of the third transformer network 221; and the fourth LC network 124, which is composed of capacitor Cra4 and resistor Lra4, is connected with the output terminal of the fourth switch network 122 and the primary side of the fourth transformer network 222.

As shown in FIG. 7, the first primary voltage equalization network 115 includes a first primary voltage equalization unit 51 and a second primary voltage equalization unit 52, and the second primary voltage equalization network 125 includes a third primary voltage equalization unit 61 and a fourth primary voltage equalization unit 62. As shown in FIG. 7, a first terminal of the first input capacitor Cin1 is connected with a first terminal of the first primary voltage equalization unit 51, a first terminal of the second primary voltage equalization unit 52, a first terminal of the first switch network 111 and a first terminal of the second switch network 112. A second terminal of the first input capacitor Cin1 is connected with a first terminal of the second input capacitor Cin2, a first terminal of the third primary voltage equalization unit 61, a first terminal of the fourth primary voltage equalization unit 62, a second terminal of the second switch network 112, a first terminal of the third switch network 121, a first terminal of the fourth switch network 122 and a second terminal of the first switch network 111. A second terminal of the second input capacitor Cin2 is connected with a second terminal of the third switch network 121 and a second terminal of the fourth switch network 122. A second terminal of the first primary voltage equalization unit 51 and a second terminal of the second primary voltage equalization unit 52 are connected with the first terminal of the second switch network 112. A third terminal of the first primary voltage equalization unit 51 is connected with a third terminal of the third switch network 121 and the third transformer network 221. A third terminal of the second primary voltage equalization unit 52 is connected with a third terminal of the fourth switch network 122 and the fourth transformer network 22. A third terminal of the third primary voltage equalization unit 61 is connected with a third terminal of the second switch network 112 and the second transformer network 212. A third terminal of the fourth primary voltage equalization unit 62 is connected with a third terminal of the first switch network 111 and the first transformer network 211. A fourth terminal of the first switch network 111 is connected with the first transformer network 211 through the first LC network, a fourth terminal of the second switch network 112 is connected with the second transformer network 212 through the second LC network, a fourth terminal of the third switch network 121 is connected with the third transformer network 221 through the third LC network, a fourth terminal of the fourth switch network 122 is connected with the fourth transformer network 222 through the fourth LC network.

As shown in FIG. 7, the first primary voltage equalization unit 51, the second primary voltage equalization unit 52, the third primary voltage equalization unit 61 and the fourth primary voltage equalization unit 62 each includes at least one serial diode voltage division branch and at least one LC resonant branch, wherein the serial diode voltage division branch includes at least one pair of serial diodes, and a central connection point of the at least one pair of serial diodes is a voltage division point, two terminals of the serial diode voltage division branch constitute the first terminal and the second terminal of the voltage equalization unit; the LC resonant branch includes at least one group of a resonant inductor and a resonant capacitor which are connected in series, wherein a first terminal of the LC resonant branch is connected with the voltage division point and a second terminal of the LC resonant branch forms the third terminal of the voltage equalization unit.

In this embodiment, the high and low voltage mode control module 400 includes a first switch K1, a second switch K2 and a third switch K3, and a high and low voltage mode controller 410 for controlling the first switch K1, the second switch K2 and the third switch K3. The first switch K1 is connected between a first terminal and a second terminal of the high and low voltage mode control module 400, and the second switch K2 is connected between the first terminal of the high and low voltage mode control module 400 and a second terminal of a load R0, the third switch K3 is connected between the second terminal of the high and low voltage mode control module 400 and a first terminal of the load R0. Meanwhile, the first terminal of the high and low voltage mode control module 400 is connected with one output terminal of the first rectification network 311 and the third rectification network 321, while the second terminal of the high and low voltage mode control module 400 is connected with one output terminal of the third rectification network 321 and the fourth rectification network 322. When charging the high-voltage electric automobile, the high-voltage mode is selected. Through the control logic of the high and low voltage mode controller 410, the switch K1 is electrically connected while the switches K2 and K3 are electrically disconnected with realize the constant power output of the high-voltage mode.

In this disclosure, voltage equalization networks are arranged in the form of a cross between the switch modules at the primary side of the transforms and the input capacitor, it is surprisingly found that a designated primary voltage deviation problem, which is caused by a change of a pulse control of an LLC resonant converter under a light load, is perfectly solved.

Figure 8:
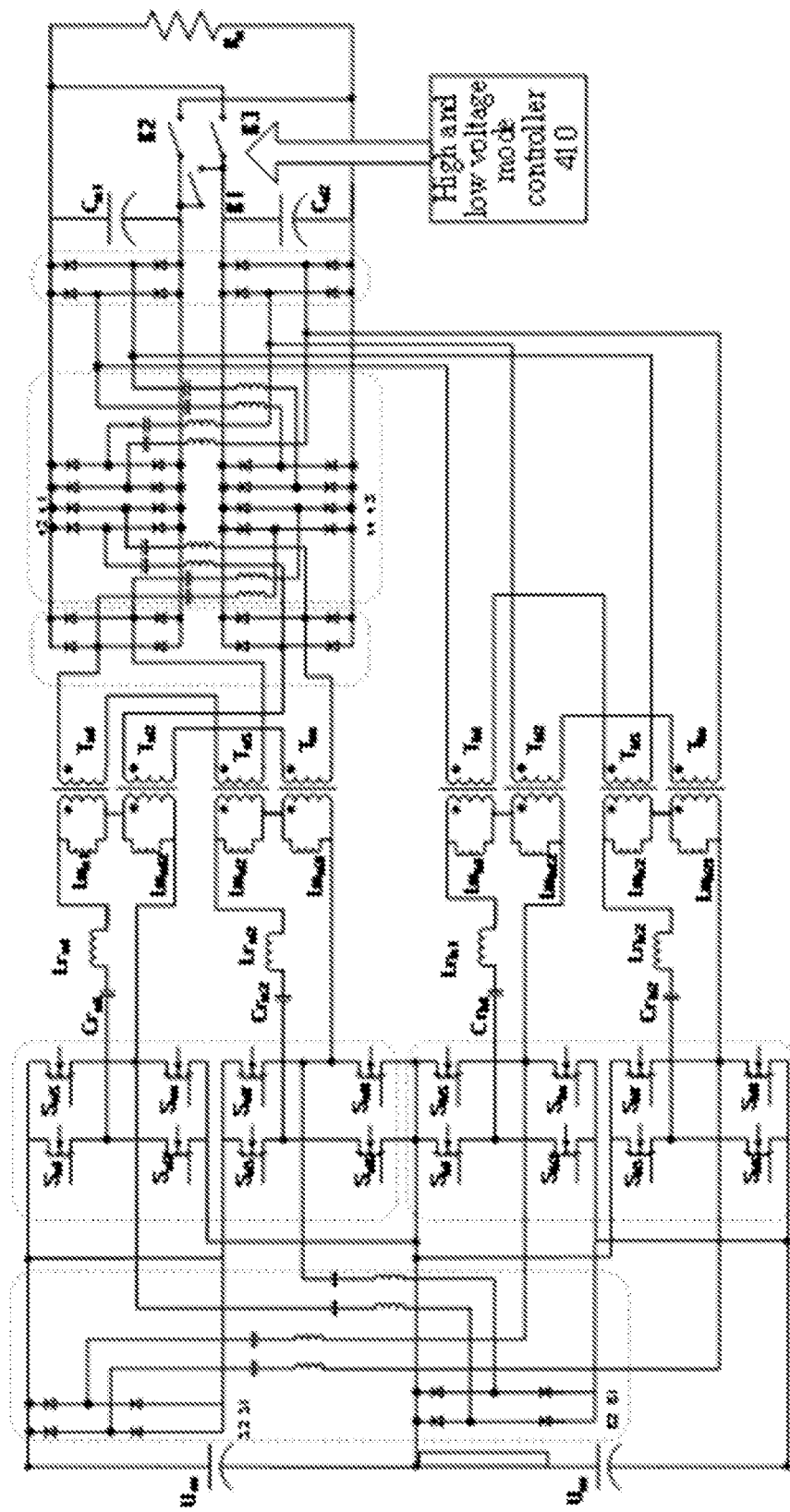
FIG. 8 is a circuit schematic diagram of a converter circuit having high power in an ultra-wide range according to another further preferred embodiment of this disclosure.

FIG. 8 is a circuit schematic diagram of a converter circuit having high power in an ultra-wide range according to another further preferred embodiment of this disclosure. In the embodiment shown in FIG. 8, the converter circuit having high power in an ultra-wide range simultaneously includes the first primary voltage equalization unit 51, the second primary voltage equalization unit 52, the third primary voltage equalization unit 61 and the fourth primary voltage equalization unit 62 which are arranged at the primary side; and the first resonant voltage equalization unit 41, the second resonant voltage equalization unit 42, the third resonant voltage equalization unit 43 and the fourth resonant voltage equalization unit 44, which are arranged at the secondary side. Accordingly, through such arrangements, the designated primary voltage deviation problem and secondary voltage deviation problem, which are caused by a change of a pulse control of an LLC resonant converter under a light load, are solved. Based on the teaching of this disclosure, one skilled in the art can realize the embodiment shown in FIG. 8, which will not be repeated here.

Although this application is described through specific embodiments, those skilled in the art should understand that various transformations and equivalent substitutions can be made to this disclosure without departing from the scope of this disclosure. In addition, various modifications can be made to this disclosure for specific situations or materials without departing from the scope of this disclosure. Therefore, this disclosure is not limited to the disclosed specific embodiments but should include all embodiments falling within the scope of the claims of this disclosure.

The above is only a preferred embodiment of this disclosure and is not intended to limit this disclosure. Any modification, equivalent replacement and improvement made within the spirit and principles of this disclosure shall be included in the protection scope of this disclosure.

What is claimed is:

1. A converter circuit having high power in an ultra-wide range,
comprising a first transformer module, a second transformer module, a first primary input module which is arranged at a primary side of the first transformer module, a first secondary output module which is arranged at a secondary side of the first transformer module, a second primary input module which is arranged at a primary side of the second transformer module, a second secondary output module which is arranged at a secondary side of the second transformer module, a high and low voltage mode control module which is operable to control the first secondary output module and the second secondary output module to be connected in series in a high-voltage mode and to be connected in parallel in a low-voltage mode, and a load output module which is operable to receive a serial output voltage or a parallel output voltage of the first secondary output module and the second secondary output module;
wherein the first primary input module includes a first primary voltage equalization network, a first switch module and a first LC module, the second primary input module includes a second primary voltage equalization network, a second switch module and a second LC module, wherein the first primary voltage equalization network is connected between a first input capacitor and the second switch module, and the second primary voltage equalization network is connected between a second input capacitor and the first switch module; wherein the first switch module is connected with the first transformer module through the first LC module, and the second switch module is connected with the second transformer module through the second LC module;
the first primary voltage equalization network includes a first primary voltage equalization unit and a second primary voltage equalization unit, the first switch module includes a first switch network and a second switch network, the first LC module includes a first LC network and a second LC network, and the second primary voltage equalization network includes a third primary voltage equalization unit and a fourth primary voltage equalization unit, the second switch module includes a third switch network and a fourth switch network, and the second LC module includes a third LC network and a fourth LC network;
the first transformer module includes at least a first transformer network and a second transformer network, wherein primary sides of the first transformer network and the second transformer network are connected in series, and secondary sides of the first transformer network and the second transformer network are respectively connected with the first secondary output module; wherein the second transformer module includes at least a third transformer network and a fourth transformer network, primary sides of the third transformer network and the fourth transformer network are connected in series, and secondary sides of the third transformer network and the fourth transformer network are respectively connected with the second secondary output module;

wherein a first terminal of the first input capacitor is connected with a first terminal of the first primary voltage equalization unit, a first terminal of the second primary voltage equalization unit, a first terminal of the first switch network and a first terminal of the second switch network; a second terminal of the first input capacitor is connected with a first terminal of the second input capacitor, a first terminal of the third primary voltage equalization unit, a first terminal of the fourth primary voltage equalization unit, a second terminal of the second switch network, a first terminal of the third switch network, a first terminal of the fourth switch network and a second terminal of the first switch network; a second terminal of the second input capacitor is connected with a second terminal of the third switch network and a second terminal of the fourth switch network; a second terminal of the first primary voltage equalization unit and a second terminal of the second primary voltage equalization unit are connected with the first terminal of the second switch network; a third terminal of the first primary voltage equalization unit is connected with a third terminal of the third switch network and the third transformer network; a third terminal of the second primary voltage equalization unit is connected with a third terminal of the fourth switch network and the fourth transformer network; a third terminal of the third primary voltage equalization unit is connected with a third terminal of the second switch network and the second transformer network; a third terminal of the fourth primary voltage equalization unit is connected with a third terminal of the first switch network and the first transformer network; a fourth terminal of the first switch network is connected with the first transformer network through the first LC network; a fourth terminal of the second switch network is connected with the second transformer network through the second LC network; a fourth terminal of the third switch network is connected with the third transformer network through the third LC network; a fourth terminal of the fourth switch network is connected with the fourth transformer network through the fourth LC network.

2. The converter circuit having high power in an ultra-wide range according to claim 1, wherein the first primary voltage equalization unit, the second primary voltage equalization unit, the third primary voltage equalization unit and the fourth primary voltage equalization unit each includes at least one serial diode voltage division branch and at least one LC resonant branch, wherein the serial diode voltage division branch includes at least one pair of serial diodes, and a central connection point of the at least one pair of serial diodes is a voltage division point, two terminals of the serial diode voltage division branch constitute the first terminal and the second terminal of the voltage equalization unit; the LC resonant branch includes at least one group of a resonant inductor and a resonant capacitor which are connected in series, wherein a first terminal of the LC resonant branch is connected with the voltage division point and a second terminal of the LC resonant branch forms the third terminal of the voltage equalization unit.

3. The converter circuit having high power in an ultra-wide range according to claim 2, wherein the high and low voltage mode control module includes a first switch, a second switch and a third switch, wherein the first switch is connected between a first terminal and a second terminal of the high and low voltage mode control module, and the second switch is connected between the first terminal of the high and low voltage mode control module and a second terminal of the load output module, the third switch is connected between the second terminal of the high and low voltage mode control module and a first terminal of the load output module.

4. The converter circuit having high power in an ultra-wide range according to claim 3, wherein the first secondary output module includes a first rectification network, a second rectification network and a first parameter voltage equalization network; the second secondary output module includes a third rectification network, a fourth rectification network and a second parameter voltage equalization network; wherein the first secondary output module or the second secondary output module further includes a first resonant voltage equalization network; an input terminal of the first rectification network is connected with the secondary side of the first transformer module, and an output terminal of the first rectification network is connected with the fourth rectification network through the first parameter voltage equalization network; an input terminal of the second rectification network is connected with the secondary side of the first transformer module, and an output terminal of the second rectification network is connected with the third rectification network through the second parameter voltage equalization network, wherein the third rectification network and the fourth rectification network are also connected with the secondary side of the second transformer module; wherein the converter circuit having high power in an ultra-wide range further includes a first resonant voltage equalization network and a second resonant voltage equalization network, the first resonant voltage equalization network includes a first resonant voltage equalization unit and a second resonant voltage equalization unit, and the second resonant voltage equalization network includes a third resonant voltage equalization unit and a fourth resonant voltage equalization unit; wherein the first parameter voltage equalization network includes a first parameter voltage equalization unit and a second parameter voltage equalization unit, and the second parameter voltage equalization network includes a third parameter voltage equalization unit and a fourth parameter voltage equalization unit.

5. The converter circuit having high power in an ultra-wide range according to claim 4, wherein a first input terminal of the first rectification network is connected with a secondary side of the first transformer network; a second input terminal of the first rectification network is connected with a secondary side of the second transformer network; a first output terminal of the first rectification network is connected with a first terminal of the third rectification network, a first terminal of the first parameter voltage equalization unit, a first terminal of the second parameter voltage equalization unit, a first terminal of the first resonant voltage equalization unit and a first terminal of the second resonant voltage equalization unit; a second output terminal of the first rectification network is connected with a fifth terminal of the third rectification network, a sixth terminal of the third rectification network, a second terminal of the first parameter voltage equalization unit, a second terminal of the second parameter voltage equalization unit, a second terminal of the first resonant voltage equalization unit and a second terminal of the second resonant voltage equalization unit; wherein a first input terminal of the second rectification network is connected with the secondary side of the first transformer network; a second input terminal of the second rectification network is connected with the secondary side of the second transformer network; a first output terminal of the second rectification network is connected with a first terminal of the fourth rectification network, a second terminal of the fourth rectification network, a first terminal of the third parameter voltage equalization unit, a first terminal of the fourth parameter voltage equalization unit, a first terminal of the third resonant voltage equalization unit, a first terminal of the fourth resonant voltage equalization unit, a second output terminal of the second rectification network is connected with a fifth terminal of the fourth rectification network, a sixth terminal of the fourth rectification network, a second terminal of the third parameter voltage equalization unit and a second terminal of the fourth parameter voltage equalization unit, a second terminal of the third resonant voltage equalization unit and a second terminal of the fourth resonant voltage equalization unit; wherein a third terminal of the first parameter voltage equalization unit is connected with a fourth terminal of the fourth rectification network; wherein a third terminal of the second parameter voltage equalization unit is connected with a third terminal of the fourth rectification network; a third terminal of the third parameter voltage equalization unit is connected with a third terminal of the third rectification network; a third terminal of the fourth parameter voltage equalization unit is connected with a fourth terminal of the third rectification network; a third terminal of the first resonant voltage equalization unit is connected with the first input terminal of the second rectification network; a third terminal of the second resonant voltage equalization unit is connected with the second input terminal of the second rectification network; a third terminal of the third resonant voltage equalization unit is connected with the second input terminal of the first rectification network; and a third terminal of the fourth resonant voltage equalization unit is connected with the first input terminal of the first rectification network.

6. The converter circuit having high power in an ultra-wide range according to claim 5, wherein the first transformer network and the second transformer network respectively include one transformer, or more transformers which are connected in series with each other.

* * * * *